US011670182B2

(12) United States Patent
McCullen et al.

(10) Patent No.: US 11,670,182 B2
(45) Date of Patent: Jun. 6, 2023

(54) SYSTEMS AND METHODS FOR INTELLIGENTLY DISPLAYING AIRCRAFT TRAFFIC INFORMATION

(71) Applicant: AVIATION COMMUNICATION & SURVEILLANCE SYSTEMS, LLC, Phoenix, AZ (US)

(72) Inventors: Robert McCullen, Queen Creek, AZ (US); Jonathan Kunze, Queen Creek, AZ (US)

(73) Assignee: AVIATION COMMUNICATION & SURVEILLANCE SYSTEMS, LLC, Phoenix, AZ (US)

( * ) Notice: Subject to any disclaimer, the term of this patent is extended or adjusted under 35 U.S.C. 154(b) by 21 days.

(21) Appl. No.: 17/377,240

(22) Filed: Jul. 15, 2021

(65) Prior Publication Data

US 2022/0020280 A1 Jan. 20, 2022

Related U.S. Application Data

(60) Provisional application No. 63/052,288, filed on Jul. 15, 2020.

(51) Int. Cl.
*G08G 5/04* (2006.01)
*G08G 5/00* (2006.01)
(Continued)

(52) U.S. Cl.
CPC .............. *G08G 5/045* (2013.01); *G06N 3/084* (2013.01); *G08G 5/0021* (2013.01); *G08G 5/0078* (2013.01)

(58) Field of Classification Search
CPC .... G08G 5/045; G08G 5/0021; G08G 5/0078; G08G 5/006; G08G 5/0065;
(Continued)

(56) References Cited

U.S. PATENT DOCUMENTS

2005/0156777 A1* 7/2005 King .................... G08G 5/0021
342/29
2010/0060511 A1 3/2010 Nouvel et al.
(Continued)

OTHER PUBLICATIONS

Kaidi R et al., Neural Network Apply to predict aircraft trajectory for conflict resolution, 2014 9th International Conference on Intelligent Systems; Theories and Application (sita-14), ieee, May 7, 2021 (May 7, 2014), pp. 1-6.
(Continued)

*Primary Examiner* — Sisay Yacob
(74) *Attorney, Agent, or Firm* — Dickinson Wright PLLC (57) ABSTRACT

There is presented systems and methods to present air traffic and other related hazards on a flight deck display in a manner that presents relevant aircraft that may be of interest to flight deck personnel at a future time, accompanied with decluttering the display by removing information pertaining to aircraft that are of lesser impact to the safe navigation of an ownship aircraft. The improved avionics system of the present invention can make decisions that are more intelligent on how to best present traffic information to a flight crew in a manner that improves upon the prior hardware processes and increases efficiency of operation of the avionics hardware and processing system by presenting relevant information and suppressing unnecessary computation and modification of display elements.

12 Claims, 5 Drawing Sheets

(51) Int. Cl.
*G06N 3/08* (2023.01)
*G06N 3/084* (2023.01)

(58) Field of Classification Search
CPC ........ G08G 5/0095; G08G 5/04; G06N 3/084; G01C 5/00; G01C 5/005
See application file for complete search history.

(56) References Cited

U.S. PATENT DOCUMENTS

| | | | |
|---|---|---|---|
| 2014/0297169 A1 | 10/2014 | Le et al. | |
| 2016/0314692 A1 | 10/2016 | Bahrami et al. | |
| 2018/0018886 A1* | 1/2018 | McCullen | G08G 5/045 |
| 2021/0096561 A1* | 4/2021 | Thomassey | G01S 13/867 |

OTHER PUBLICATIONS

Yang Kaiqiao et al., LSTM-Based Deep Learning Model for Civil Aircraft Position and Attitued Prediction Approch, 2019 Chines Control Conference (CCC), Technical Committee on Control Theory, Jul. 27, 2019 (Jul. 27, 2019), pp. 8689-8694.

Notification of Transmittal of the International Search Report and the Written Opinion of the International Searching Authority, or the Declaration dated Oct. 25, 2021 (Oct. 25, 2021) issued on related international patent application PCT/US2021/041896 by the European Patent Office / International Searching Authority.

* cited by examiner

SYSTEMS AND METHODS FOR INTELLIGENTLY DISPLAYING AIRCRAFT TRAFFIC INFORMATION

CROSS REFERENCE TO RELATED APPLICATIONS

This application claims the full benefit of and priority to U.S. provisional patent application No. 63/052,288 filed Jul. 15, 2020 titled, "Systems and Methods for Intelligently Displaying Aircraft Traffic Information," the disclosure of which is fully incorporated herein by reference for all purposes.

FIELD AND BACKGROUND OF THE INVENTION

Field of the Invention

The present disclosure relates to aircraft avionics. More particularly, this application relates to the determination and presentation of information most relevant to aircraft cockpit personnel.

Background of the Invention

Figure 1:
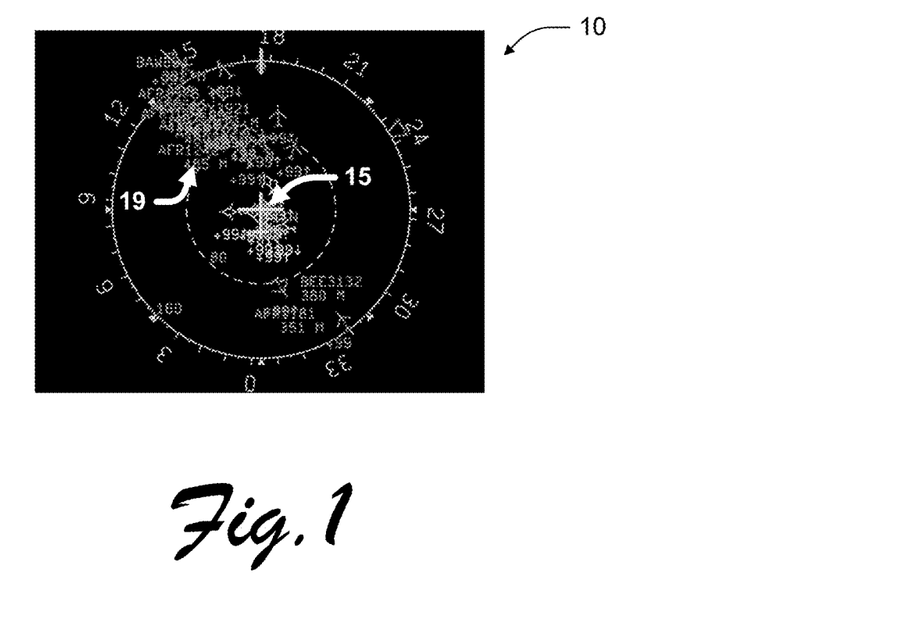
FIG. 1 shows an image of a flight deck display, illustrating a view of ownship with respect to numerous external aircraft.
Figure 2:
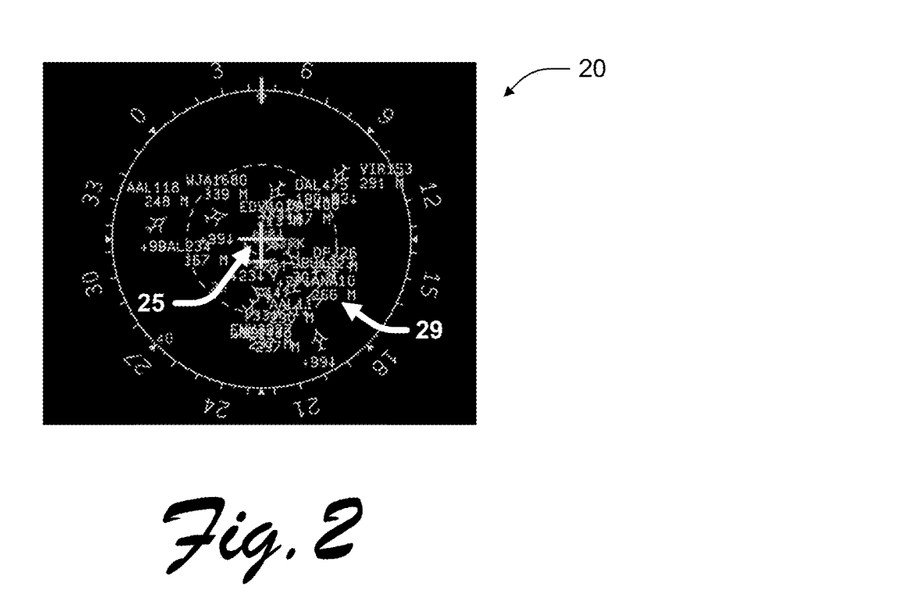
FIG. 2 shows another image of a flight deck display, illustrating a view of ownship with respect to numerous external aircraft.

As air traffic densities continue to increase, cockpit displays in aircraft that are capable of displaying nearby traffic and air-travel related hazards can become so filled with information that pilots may be unable to easily discern true threats to safe navigation over time. FIGS. 1-2 show, respectively exemplary cockpit displays 10, 20 with in icon depicting ownship aircraft 15, 23, at the centers of respective cockpit displays 10, 20, with numerous depictions of nearby aircraft, 19, 29 that are of sufficient density to impair a flight deck crew's ability to perceive upcoming threats from aircraft that are less likely or unlikely to become threats in the near future. Thus, highly cluttered cockpit displays may provide diminishing returns on information presented to the flight deck, and solutions are needed to present the most relevant information to flight deck crew while reducing information that is of limited use in safe navigation.

SUMMARY OF THE INVENTION

The following summary of the invention is exemplary and explanatory only and is not necessarily restrictive of the invention as claimed. It should be noted that in various embodiments, description is made with reference to figures. However, certain embodiments may be practiced without one or more of these specific details, or in combination with other known methods and configurations. In the following summary and detailed description, numerous details are set forth, such as specific configurations, dimensions and processes, etc., in order to provide a thorough understanding of the present invention. In other instances, well-known processes and conventional hardware have not been described in particular detail in order to not unnecessarily obscure the present invention. Reference throughout this specification to "one embodiment," "an embodiment' or the like means that a particular feature, structure, configuration, or characteristic described in connection with the embodiment is included in at least one embodiment of the invention. Thus, the appearances of the phrase "in one embodiment," "an embodiment," or the like in various places throughout this specification are not necessarily referring to the same embodiment of the invention. Furthermore, the particular features, structures, configurations, or characteristics may be combined in any suitable manner in one or more embodiments.

Embodiments of the present invention provide innovative approaches to display air traffic and other related hazards on a flight deck display (or other suitable display whether displayed on a portable computing device such as a digital tablet or located remotely on a display at a ground air traffic control ("ATC") station), by, among other things, applying artificial intelligence ("AI") and machine learning to traffic information and ownership information. By creating improvements to avionics systems that implement innovative changes to processor and display operation beyond those conventionally available, traffic which was obscured to the point of impairing visual determination of threats may be selectively minimized, and traffic targets or other hazards of most relevant interest are presented by the system for consideration by the flight crew, who would otherwise struggle with or be unable to use human means, in real time or otherwise, to make a timely determination of upcoming traffic threats in an over-cluttered display. Thus an improved avionics system of the present invention can make decisions that are more intelligent on how to best present traffic information to a flight crew in a manner that improves upon the prior hardware processes and increases efficiency of operation of the avionics hardware and processing system by presenting relevant information and suppressing unnecessary computation and modification of display elements. Further, embodiments of the present invention may provide a traffic system that can determine which traffic information is most relevant to the flight crew at specific times and selectively display what is deemed most appropriate in the given operating environment of an aircraft.

As shown for example, in FIGS. 1-2, in cockpits of airliners around the world, flight traffic displays get crowded with hundreds of aircraft depicted as tiny icons, such as triangles, on a small screen. Pilots appreciate the situational awareness that these displays provide, but are sometimes overwhelmed by a nearly unintelligible mass of aircraft icons indicating other nearby aircraft. Thus aspects of the present invention provide an apparatus, system, and method to predict the movement of nearby aircraft several minutes into the future, and the ownship flight deck crew benefits from identifying which traffic will most likely be of interest to ownership, and therefore, distinguish those aircraft most likely to be of interest from those to be of comparatively less interest. For example, embodiments of the present invention may so identify such traffic of interest and highlight same on any desired display in the aircraft cockpit. In another embodiment, aspects of the display may fade out traffic of less interest, or even suppress display of such traffic, based on determination of lesser or no-traffic risk. In certain embodiments, as an example, a traffic prediction model within a prediction display management system may remove likely fly-over traffic when ownship is on approach to land at an airport. Such traffic forecasting, in various embodiments, involves than a linear projection based on current position and speed of ownership and related traffic. Embodiments of the present invention may, as well, predict for traffic around ownership likely upcoming turns, climbs, descents or any other desired aircraft parameter relevant to aircraft maneuver forecasting. For example, embodiments may indicate traffic on same/similar trajectories to ownship, indicate traffic that has potential to be on collision course with ownship, highlight same airline traffic as ownship, and the like.

Further, various embodiments of the current invention may be customized (per airline, per pilot, per flight path.) to illustrate traffic information differently. For example, if aspects of the present invention are implemented on a tablet or laptop, the ownship pilot can set preferences on what information is displayed, a threshold window for analysis of flight tracks, settings for how aircraft tracks are to be displayed, and the like. Also, external conditions and flight terrain may be used to customize the predictive model, and oceanic vs regional pilots may have different preferences in how embodiments operate. Further, CTS relationships may be utilized to work directly with pilots and trainers to refine the algorithms for optimal use by aircraft operators.

In one embodiment, there is presented a method that comprises obtaining a plurality of recent aircraft track parameters pertaining to target aircraft external to and in vicinity of an ownship aircraft; preparing a sequence of predictions forecasting respective positions of each of the target aircraft track parameters at time samples uniformly-spaced across a predetermined time period; forecasting an ownship position and forecasting a position of each computed track with respect to the forecasted ownship position; determining whether each of the computed tracks may cross within a predetermined near-range threshold of ownship's forecast position; and visually highlighting, on a display, each of the computed tracks may cross within a predetermined range of ownship's forecast position. Aspects may further comprise suppressing computed tracks of external aircraft that do not cross within a predetermined range of ownship's forecast position, and also, the near-range threshold may be adjusted by one of flight deck personnel or an airline technician. Additionally, in various embodiments a traffic alert received by an avionics traffic collision avoidance system of ownship may prevent suppression of external aircraft tracks. In yet another embodiment, the forecasting occurs at least in part within a neural network component, and in one aspect, the neural network component comprises one or more of an Encoder/Decoder Recurrent Neural Network (RNN), a Convolutional Neural Network (CNN) and a Convolutional Neural Network-Recurrent Neural Network Hybrid (CNN-RNN).

The neural network may be trained with any desired process, for example, by presenting the neural network with training data, comparing pre-determined ground truth output sequences to forecasted output sequences computed by the neural net; determining an error metric for each comparison; based upon the error metric, back propagate changes to layers within the neural network; and continuing presentation of the training data until a predetermined operational accuracy is determined. Further, in another aspect, the training data may be prepared by: obtaining a database of prior flight tracks in view of an ownship track; segmenting available traffic data by flight; cleaning and normalizing parameters such as position and velocity; and interpolating the parameters into uniformly-spaced time samples.

There is presented in a system embodiment of the present invention an avionics system comprising one or more processors, memory coupled to the processors, and a top antenna and a bottom antenna electrically and communicatively coupled to the avionics system, further including: a Traffic Collision Avoidance System (TCAS) component, a flight deck display electrically and communicatively coupled to the TCAS component; and a prediction display management system coupled to the TCAS component and the flight deck display, the prediction display management system further comprising a predictive model component; wherein software stored within a memory of the avionics system is configured to execute the steps of: obtaining a plurality of recent aircraft track parameters pertaining to target aircraft external to and in vicinity of an ownship aircraft; preparing a sequence of predictions forecasting respective positions of each of the target aircraft track parameters at time samples uniformly-spaced across a predetermined time period; forecasting an ownship position and forecasting a position of each computed track with respect to the forecasted ownship position; determining whether each of the computed tracks may cross within a predetermined near-range threshold of ownship's forecast position; and visually highlighting, on a display, each of the computed tracks may cross within a predetermined range of ownship's forecast position. In one embodiment, the system further executes the steps of suppressing computed tracks of external aircraft that do not cross within a predetermined range of ownship's forecast position. In one aspect, the near-range threshold of the system may be adjusted by one of flight deck personnel or an airline technician, and a traffic alert received by an avionics traffic collision avoidance system of ownship may prevent suppression of external aircraft tracks. Further, the forecasting may occur at least in part within a neural network component, and the neural network component comprises one or more of an Encoder/Decoder Recurrent Neural Network (RNN), a Convolutional Neural Network (CNN) and a Convolutional Neural Network-Recurrent Neural Network Hybrid (CNN-RNN). The neural network component by any technique such as presenting the neural network with training data; comparing pre-determined ground truth output sequences to forecasted output sequences computed by the neural net; determining an error metric for each comparison; based upon the error metric, back propagate changes to layers within the neural network; and continuing presentation of the training data until a predetermined operational accuracy is determined. Further, the training data may be prepared by: obtaining a database of prior flight tracks in view of an ownship track; segmenting available traffic data by flight; cleaning and normalizing parameters such as position and velocity; and interpolating the parameters into uniformly-spaced time samples.

BRIEF DESCRIPTION OF THE DRAWINGS

A more complete understanding of the present invention may be derived by referring to the detailed description and claims when considered in connection with the following illustrative figures.

DETAILED DESCRIPTION

Figure 3:
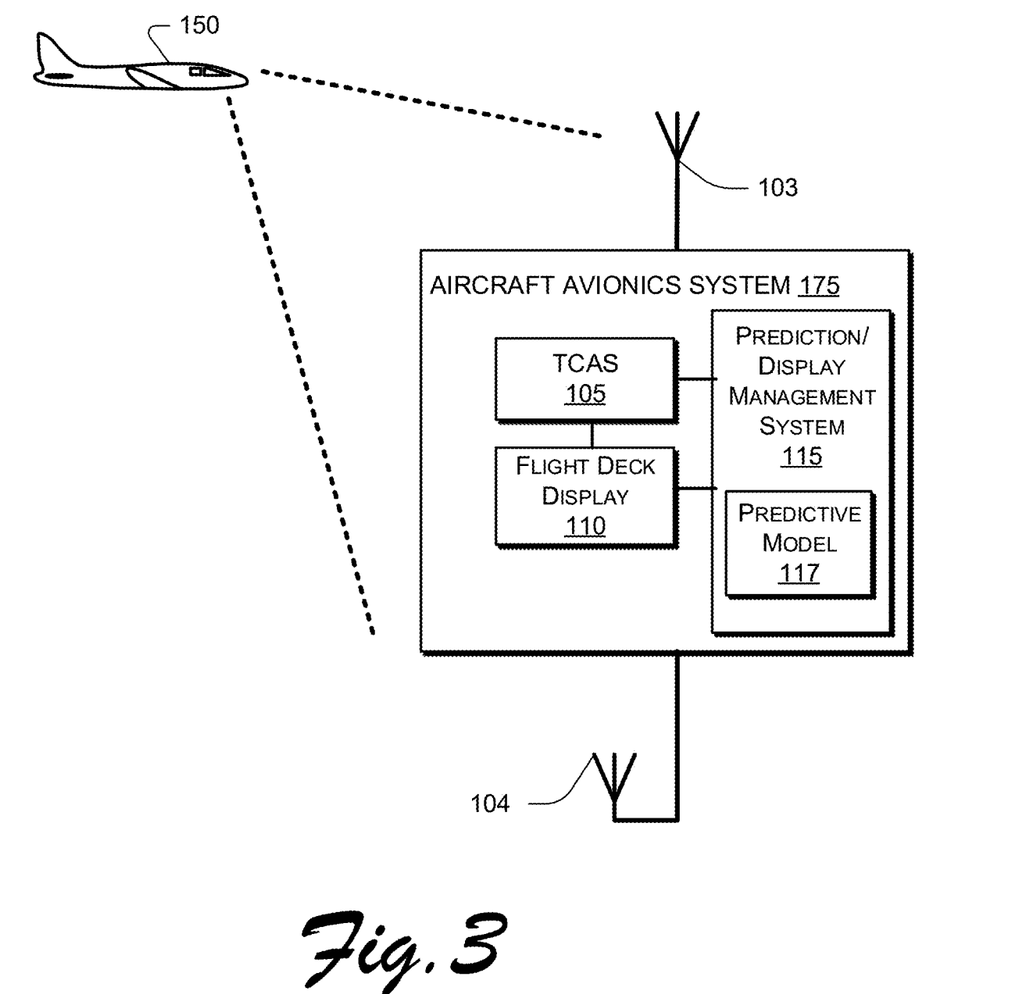
FIG. 3 illustrates a conceptual block diagram of a system of the present invention.

FIG. 3 illustrates shows an embodiment of the present invention where ownship 150 is equipped with the Aircraft Avionics System 175 of the present invention, including top antenna 103 and bottom antenna 104, electrically and/or communicatively coupled to the system 175. The Aircraft Avionics System 175 comprises a TCAS (Traffic Collision Avoidance System) 105, which may be electrically and/or communicatively coupled to a flight deck display 110 (which may include a plurality of displays and may include a computing tablet or mobile electronic device), and a prediction display management system (PDMS) 115, which further comprises a predictive model element 117. The PDMS may be integrated within the TCAS 05 unit, or may be separately removed therefrom, such as in a separate line-replaceable unit (LRU) that is electrically and communicatively coupled to the avionics system 175. More avionics components within an ownship 150's avionics suite may be coupled to or included within the aircraft avionics system 175, including ADS-B in/out systems, Distance Measuring Equipment (DME) systems, GPS systems, airport geographical database systems, TAWS systems, weather radar/tracking systems, and any other avionics component adapted for use in ownship aircraft 150. By preparing the predictive model 117 within the PDMS 115 with appropriately training data sets, the model 117 may be used in production by the PDMS 115 to, for example, display the most relevant flight tracks of aircraft in the area of ownship 150 on the ownship 150 display 110, and suppress less-relevant flight tracks from the display 110.

Figure 4:
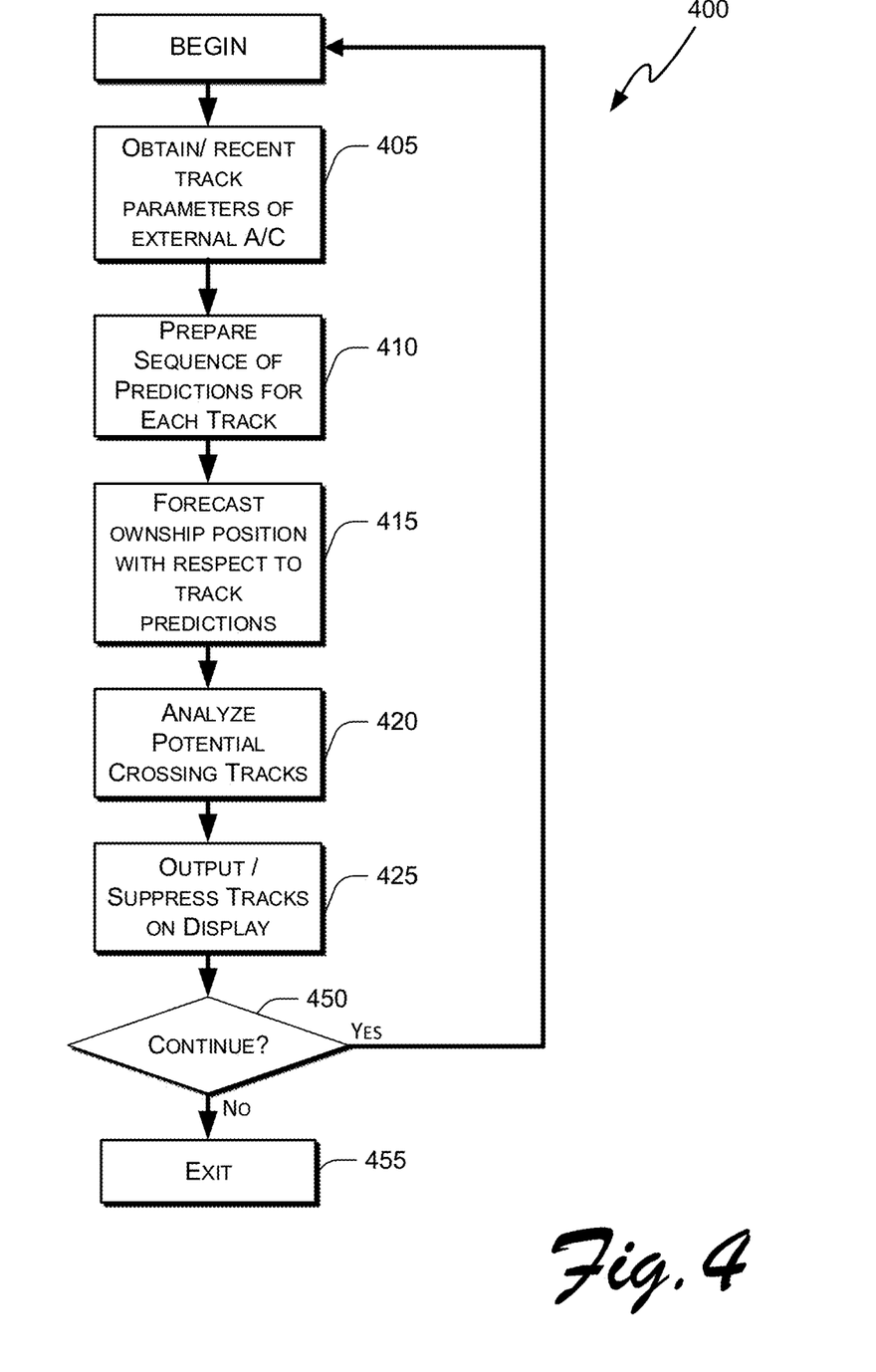
FIG. 4 shows a flow diagram of one aspect of a method of the present invention.

In one embodiment illustrated in the process diagram 400 of FIG. 4 that is utilized in conjunction with the system 175 illustrated in FIG. 3, the predictive model 117 within the Prediction/Display Management System 115 is provided the most recent track parameters (such as position and velocity) of other aircraft 405 in vicinity of ownship 150 from the TCAS (Traffic Collision Avoidance System) system 105 onboard the ownship aircraft 150. The predictive model in the prediction display management system 115 prepares 410 a sequence of predictions forecasting the position of each aircraft track at uniformly-spaced time samples into the future. The prediction display management system 115 then forecasts the ownship 150 position and also forecasts the position of each computed track in view of a forecasted ownship position 415. The predicted ownship and tracks are analyzed 420, and those that are predicted to cross within close range of ownship (within a selectable near-range threshold, discussed below) are visually highlighted 425 on the display 110, while tracks that are not may be removed/suppressed 425 from the display 110. As long as the flight of ownship 150 is in progress, or as long as flight deck crew desires, the process then iterates 450 to a next predetermined time sequence as flight of the ownship 150 progresses. The timing of the calculation/display iteration within the PDMS 115 is predetermined and may be selected by a user such as a pilot or airline technician.

A pre-defined "near range" threshold around ownship can be used to ensure all tracks within a certain range of ownship 150 will be displayed regardless of model forecast. Traffic Alerts, such as TCAS TAs (Traffic Advisories) and RAs (Resolution Advisories), may also override the model and guarantee that an alerting track will be displayed regardless of model forecast.

Figure 5:
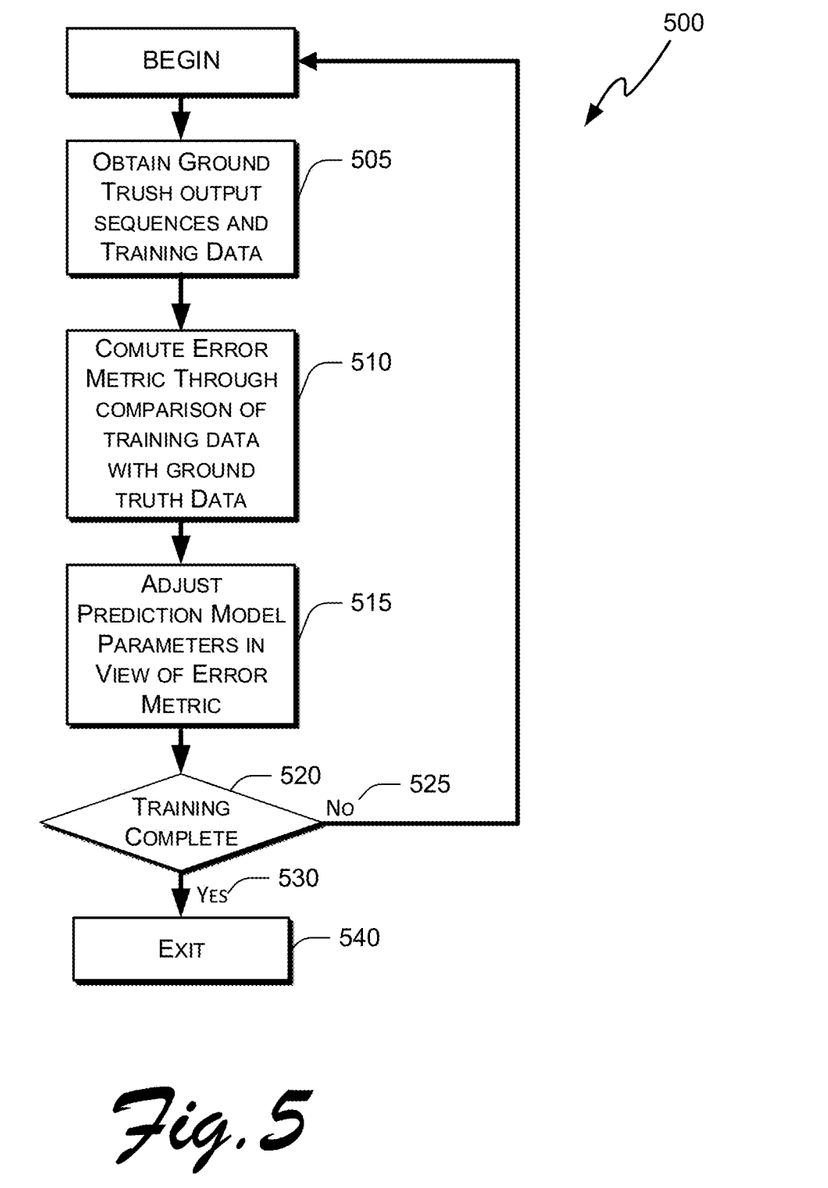
FIG. 5 shows another flow diagram of one aspect of a method of the present invention.

In one embodiment, shown in the process flow diagram 500 of FIG. 5, which is explained in view of the context of FIG. 3, the predictive model 117 (also described herein as the "forecasting model") within the prediction display management system 115 may be trained to accomplish methods of the present invention. The predictive model 117 is presented with training data 505, and then by comparing pre-determined "ground truth" output sequences (those of skill in the art will understand these "ground truth" sequences to include desired output sequences for the model to emulate) to forecasted output sequences that are computed by a current configuration of the model 117, and a level of error (an "error metric") is computed 510. Network backpropagation, using any conventional method known to those of skill in the art of neural network training, is performed iteratively across the network using this error metric to adjust model parameters 515 and improve model performance of the prediction display management system 115. The training process may iterate 520, 525 until some predetermined error metric is obtained for a given set of training data 530, and the trained network configuration may then be saved in a non-volatile or volatile memory for production use by the prediction module of the prediction display management system 115, and the training sequence is complete 540.

The training data utilized to train the network in the above-described process may be prepared by any desired approach, such as obtaining a database of prior flight tracks in view of an ownship track; segmenting available traffic data by flight, cleaning and normalizing parameters such as position and velocity, and interpolating those parameters into uniformly-spaced time samples. A "sliding window" may then be used to collect a fixed-length subset of contiguous samples within a defined window of time. The window is then slid one sample in the future and the next subset of samples that fall within that fixed-length window is collected. Each of the resulting sets of contiguous samples are then split such that the early samples are used as input sequences into the forecasting model and the later samples are used as "ground truth" output sequences for the forecasting model.

Any desired type of trainable forecasting model may be utilized in concert with the predictive model 117. In one embodiment, the forecaster module may comprise an Encoder/Decoder Recurrent Neural Network (RNN). In this embodiment, utilizing a sequence-to-sequence model, the Encoder/Decoder RNN model performs multi-step time series forecasting. The model comprises two stages: an encoder and a decoder. The encoder may be implemented as a set of recurrent neural network nodes, and in one embodiment utilizing a Long-Short Term Memory (LSTM) type, that may accept a multivariate, fixed-length input sequence of the most recent time samples and produce an array of features. This embodiment, also of LSTM type, accepts the features generated by the encoder and produces a multivariate, fixed-length output sequence of predicted time samples in the future.

In a second embodiment, the forecaster module may comprise a Convolutional Neural Network-Recurrent Neural Network Hybrid (CNN-RNN). In this sequence-to-sequence model embodiment, the CNN-RNN model has similarities to the Encoder-Decoder model described above, but a first stage of the model comprises a Convolutional Neural Network (CNN). The CNN accepts a multivariate, fixed-length input sequence of the most recent time samples and learns a set of kernels, producing an array of features. The output features generated by the CNN are passed to the recurrent neural network nodes, in one embodiment, the application being LSTM type. The LSTM layer then produces a multivariate, fixed-length output sequence of predicted time samples in the future.

Those of skill in the relevant arts understand that many different CNN architectures may be used to implement aspects of the present invention. One exemplary CNN architecture may be realized through an Inception model implemented with a tool such as Tensorflow™, and explanatory examples are provided, for instance, at https://www.tensorflow.org/tutorials/image recognition, the disclosure of which is hereby incorporated by reference herein for all purposes. Alternative implementations of the present invention may be implemented through a Deep Residual Network (an explanation available at https://blog.waya.ai/deep-residual-learning-9610bb62c355 is incorporated by reference herein for all purposes), and or through Convolutional Network architecture implemented in environments such as Torch (examples and explanatory text provided at http://torch.ch/docs/tutorials.html, the disclosures of which are fully incorporated by reference herein for all purposes). Background introductions for neural network architectures in general, and Convolutional Neural Networks (CNNs) in particular are also provided in Michael A. Nielsen, "Neural Networks and Deep Learning", Determination Press, 2015 available at http://neuralnetworksanddeeplearning.com, the disclosure of which is fully incorporated by reference herein for all purposes.

In general, CNNs are one type of model architecture that has been successfully used for classification tasks such as image classification. CNNs apply a series of filters to the raw pixel data of an image to extract and learn higher-level features, which the model can then use for classification. CNNs typically contain three components: (1) Convolutional layers, (2) Pooling layers, and (3) Dense/fully connected layers.

Convolutional layers apply a specified number of convolution filters to the data. For each identified subregion within the data, the convolutional layer performs a set of mathematical operations to produce a single value in the output feature map. Convolutional layers then typically apply a ReLU activation function (a Rectified Linear Unit), to the output to introduce nonlinearities into the model; however, in various embodiments logistic sigmoid functions or hyperbolic tangent activation functions may also be utilized.

Pooling layers down-sample the image data extracted by the convolutional layers to reduce the dimensionality of the feature map in order to decrease processing time. Practically, a pooling function replaces the output of the net at a certain location with a summary statistic of the nearby outputs. A commonly used pooling algorithm is max pooling, which extracts subregions of the feature map, keeps their maximum value, and discards all other values, thus reporting the maximum output within a rectangular neighborhood. Other possible pooling functions include the average of a rectangular neighborhood, the L2 norm of a rectangular neighborhood, or a weighted average based on the distance from the central pixel. Dense (fully connected) layers perform classification on the features extracted by the convolutional layers and the down-sampled by the pooling layers. In a dense layer, every node in the layer is connected to every node in the preceding layer.

As introduced above, a CNN is composed of a stack of convolutional modules that perform feature extraction, and each module consists of a convolutional layer followed by a pooling layer; the last convolutional module is followed by one or more dense layers that perform classification. The final dense layer in a CNN contains a single node for each target class in the model (all the possible classes the model may predict), with an activation function for each node. The CNN allows interpretation of the values for a given image as relative measurements of how likely it is that the image falls into each target class. In various embodiments of the present invention, a target class may comprise a specific track of an aircraft external to ownship 150 that is predicted then later analyzed for relevancy in displaying on ownship display 110. In addition, through such analysis, early threat indicators may be provided to the flight deck of ownship 150, for example, by highlighting a specific aircraft of interest on the display 110 and a likely flight track for that aircraft in relation to ownship 150.

Embodiments of the present application utilize Convolutional Neural Network (CNN) architectures to analyze captured images, videos, and/or audio files from mobile devices to identify defects and to provide analytical information such as heat maps in assisting with the further analysis of defect types.

Figure 6:
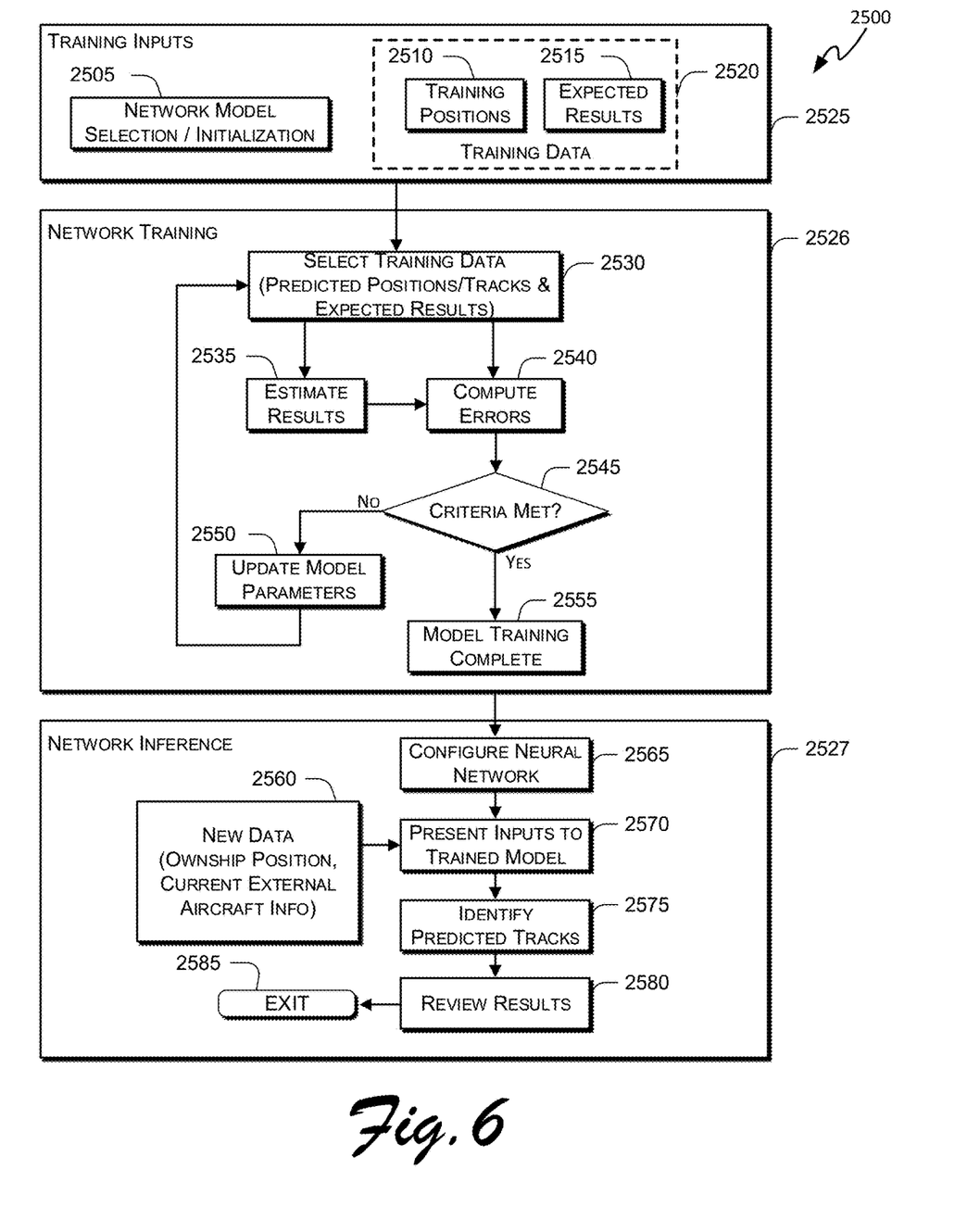
FIG. 6 illustrates a comprehensive flow diagram describing neural network training from network training data, and network inference processes to identify defects using the trained neural network.

FIG. 6 presents an overview of a flow diagram 2500 for another embodiment of the present invention, including three phases: a training preparation phase 2525, a network training phase 2526, and a network inference phase 2527. As discussed in brief previously, disclosed systems and methods for identifying device defects generally include several stages that will be discussed in turn; for example a training stage that "trains" or "learns" a neural network model such as a CNN model using training datasets, and a prediction or inference stage in which the trained CNN model uses the training datasets and input data to identify predicted aircraft tracks/positions. As used herein, "training" a neural network model refers to determining one or more parameters of at least one layer in the model. For example, a convolutional layer of a CNN model may include at least one filter or kernel. One or more parameters, such as kernel weights, size, shape, and structure, of the at least one filter may be determined by e.g., a back-propagation-based training process. As used with respect to the embodiment described herein, "predicting" from a CNN model refers to identifying aircraft tracks/positions from current aircraft position data and ownship position 2510.

In the training preparation phase 2525, training inputs 2520 are prepared and processed for use in training the neural network component. A network model is selected 2505 for use in training; such model selection may include, for example, identification of a convolutional neural network architecture, recurrent architecture, or hybrid architecture and appropriate processing layer configuration. The neural network component model (or predictive model 117) is initialized with an initial layer configuration, an initial connection configuration, a set of weights, and a set of biases. In addition to data 2510 and respective expected results (also known to those of skill in the relevant arts as "ground truth" data) 2515, other parameters (as described more fully below) may be specified for input as training data 2520, such as identifying information for each respective aircraft condition, or environment. In an embodiment, training data 2520 may also include data for actual aircraft traces or simulated aircraft traces/positions. In another embodiment, training data 2520 may be synthetically created, e.g. computer-generated based upon theoretically possible tracking/flight situations or devised for purposes of model testing.

In various embodiments, the preparation phase 2525 includes resampling all the training data 2520 to a common size and content where necessary. After data preparation, training data and testing data represent aircraft tracking data/positions and respectively corresponding identified tracks/positions comprising the ground truth data.

The network training phase 2526 commences with training data 2520 being presented to the configured and initialized neural network model from step 2505 (with no input specified). The neural network component estimates results 2535 from the data and produces estimated results, for example, a predicted position which may be added to previous predicted positions to create a track. A comparison is then made between the estimated results from step 2535 and the expected results 2515 corresponding 2510, and an error map ("training error") is generated based on differences between the expected results 2515 and the estimated results 2535. The error map is compared to evaluation criteria 2545. For example, a loss function such as a mean absolute error function (MAE), or mean squared error (MSE) function, can be used to determine whether error criteria are met. One skilled in the art would be familiar with various loss functions, such as the mean absolute error (MAE) of the model prediction or L1 norm, or the mean squared error (MSE) or L2 norm where $\hat{\theta}^*$ comprises the choice of parameters that minimizes the differences between Y and Y*. A back-propagation algorithm may be used to compute the gradient of the error function with respect to the model parameters or weights. Then $\theta$ may be updated iteratively using a stochastic gradient descent algorithm to converge on $\hat{\theta}^*$.

If the errors do not satisfy the error threshold criterion, the model parameters of the neural network (e.g., weights and biases) are updated 2550, e.g. to minimize error according to a learning algorithm (e.g. a regularized gradient descent optimization approach), and the training data is re-presented 2530 to the neural network with the neural network's newly-assigned model parameters.

In one embodiment, determining whether criteria are met 2545 includes presenting one or more test aircraft position/flight data that are different from the training data to the network model as currently configured to generate an estimate of tracks respectively corresponding to such test data. The resulting defect classifications can then be compared with the ground truth/expected classifications to assess the quality of the network parameter model. The differences between the expected positions/tracks and the estimated tracks for this test data is the "test error." In any event, iteration from step 2550 to step 2530, to steps 2535 and 2540, to step 2545 continues until the error threshold criterion is met, whereupon the training process 2525 concludes 2555, with a trained neural network component model ready for use with real and live flight data presented to or obtained by the system 175.

In an alternative embodiment, the neural network may be trained in multiple steps and various portions of the neural network may be trained with separate training data sets to achieve particular defect classification. For example, a convolutional neural network of the present invention may be pre-trained to recognize a large number of generic object classes, and then a final layer of the network may be retrained to identify specific items or tracks. Using multiple training passes, such as training a network with a large number of visual classes then retraining a final layer of the network with specific defects to be detected may provide embodiments with advantages of efficiency over retraining an entire network if the training data 2560 is updated or changed with new defect types or updated amounts of training examples. Once trained, the neural network component model 117 may be stored in a memory such as within the avionics system 175, the PDMS 115, or the predictive model 117, within non-transitory memory in any of the foregoing or in a database of the foregoing. The trained network model may then be used in the network inference steps 2527 to compute a useful output (e.g. predicted aircraft positions and traces) when analysis is desired. The trained neural network is configured 2565, for example, by loading stored weights and biases for the particular trained network configuration. In a preferred embodiment, predicted results comprise one of a defect classification with identified defects, or a defect classification with a displayed heat map. Thus, for the device of interest, device images and/or data 2560 are presented to the trained and configured neural network model 2570 to produce the predicted results 2575. In a further embodiment, the predicted results are in turn reviewed 2580 by any desired entity, such as for use in determining flight safety when in communication with ATC ground personnel, external aircraft, or for flight planning purposes.

The particular implementations shown and described above are illustrative of the invention and its best mode and are not intended to otherwise limit the scope of the present invention in any way. Indeed, for the sake of brevity, conventional data storage, data transmission, and other functional aspects of the systems may not be described in detail. Methods illustrated in the various figures may include more, fewer, or other steps. Additionally, steps may be performed in any suitable order without departing from the scope of the invention. Furthermore, the connecting lines shown in the various figures are intended to represent exemplary functional relationships and/or physical couplings between the various elements. Many alternative or additional functional relationships or physical connections may be present in a practical system.

Changes and modifications may be made to the disclosed embodiments without departing from the scope of the present invention. These and other changes or modifications are intended to be included within the scope of the present invention, as expressed in the following claims.

What is claimed is:

1. A method comprising
   obtaining a plurality of aircraft track parameters pertaining to target aircraft external to and in a vicinity of an ownship aircraft;
   determining, using the plurality of aircraft track parameters, a respective forecast position and a respective forecast track at time samples within a predetermined time period, for each of the target aircraft;
   determining a forecast ownship position and a forecast position of each forecast track with respect to the forecast ownship position;
   determining whether each of the forecast tracks crosses within a near-range threshold of the forecast ownship's position;
   visually highlighting, on a display, each of the forecast tracks that crosses within the near-range threshold a of the forecast ownship position; and
   based on receiving a traffic alert from an avionics traffic collision avoidance system of the ownship, visually highlighting, on the display, each of the forecast tracks that do not cross within the near-range threshold of the forecast ownship position.

2. The method of claim 1, wherein the near-range threshold is adjustable by one of flight deck personnel or an airline technician.

3. The method of claim 1, wherein the determining the respective forecast position and the respective forecast track for each of the target aircraft and the determining the forecast ownship position comprise using a neural network component.

4. The method of claim 3, wherein the neural network component comprises one or more of an Encoder/Decoder Recurrent Neural Network (RNN), a Convolutional Neural Network (CNN) and a Convolutional Neural Network-Recurrent Neural Network Hybrid (CNN-RNN).

5. The method of claim 3, further comprising training the neural network by
presenting the neural network with training data;
comparing pre-determined ground truth output sequences to forecasted output sequences computed by the neural network;
determining an error metric for each comparison;
based upon the error metric, back propagate changes to layers within the neural network; and
continuing presentation of the training data until a pre-determined operational accuracy is determined.

6. The method of claim 5, further comprising preparing the training data by:
obtaining a database of prior flight tracks in view of an ownship track;
segmenting available traffic data by flight;
cleaning and normalizing parameters comprising such as position and velocity;
and interpolating the parameters into uniformly-spaced time samples.

7. A system comprising an avionics system comprising one or more processors, a memory coupled to the processors, a top antenna and a bottom antenna electrically and communicatively coupled to the avionics system, and further comprising:
a Traffic Collision Avoidance System (TCAS) component,
a flight deck display electrically and communicatively coupled to the TCAS component; and
a prediction display management system coupled to the TCAS component and the flight deck display, the prediction display management system further comprising a predictive model component;
wherein software stored within a memory of the avionics system is configured to execute a method comprising:
obtaining a plurality of aircraft track parameters pertaining to target aircraft external to and in a vicinity of an ownship aircraft;
determining, using the plurality of aircraft track parameters, a respective forecast position and a respective forecast track at time samples within a predetermined time period, for each of the target aircraft;
determining a forecast forecasting an ownship position and a forecast position of each forecast track with respect to the forecast ownship position;
determining whether each of the forecast tracks that crosses within a near-range threshold of the forecast ownship position; and
visually highlighting, on a display, each of the forecast tracks that crosses within the near-range threshold of the forecast ownship position; and
based on receiving a traffic alert from an avionics traffic collision avoidance system of the ownship, visually highlighting, on the display, each of the forecast tracks that do not cross within the hear-range threshold of the forecast ownship position.

8. The system of claim 7, wherein the near-range threshold is adjustable by one of flight deck personnel or an airline technician.

9. The system of claim 7, wherein the avionics system further comprises a neural network component, and the determining the respective forecast position and the respective forecast track for each of the target aircraft and the determining the forecast ownship position are performed by the neural network component.

10. The system of claim 9, wherein the neural network component comprises one or more of an Encoder/Decoder Recurrent Neural Network (RNN), a Convolutional Neural Network (CNN) and a Convolutional Neural Network-Recurrent Neural Network Hybrid (CNN-RNN).

11. The system of claim 9, wherein the method further comprises training the neural network component by:
presenting the neural network with training data;
comparing pre-determined ground truth output sequences to forecasted output sequences computed by the neural network component;
determining an error metric for each comparison;
based upon the error metric, back propagate changes to layers within the neural network component; and
continuing presentation of the training data until a pre-determined operational accuracy is determined.

12. The system of claim 11, wherein the wherein the training the neural network further comprises preparing the training data by:
obtaining a database of prior flight tracks in view of an ownship track;
segmenting available traffic data by flight;
cleaning and normalizing parameters comprising position and velocity;
and interpolating the parameters into uniformly-spaced time samples.

* * * * *